United States Patent [19]
Cunningham et al.

[11] Patent Number: 5,442,492
[45] Date of Patent: Aug. 15, 1995

[54] DATA RECOVERY PROCEDURE USING DC OFFSET AND GAIN CONTROL FOR TIMING LOOP COMPENSATION FOR PARTIAL-RESPONSE DATA DETECTION

[75] Inventors: Earl A. Cunningham; Joe M. Poss, both of Rochester, Minn.

[73] Assignee: International Business Machines Corporation, Armonk, N.Y.

[21] Appl. No.: 85,069

[22] Filed: Jun. 29, 1993

[51] Int. Cl.[6] .............................................. G11B 5/09
[52] U.S. Cl. ...................................................... 360/46
[58] Field of Search ...................... 360/46, 53, 61, 63, 360/67, 113; 358/158, 19

[56] References Cited

U.S. PATENT DOCUMENTS

| 3,696,399 | 10/1972 | Klein et al. | 341/141 X |
|---|---|---|---|
| 3,851,266 | 11/1974 | Conway | 328/162 |
| 4,003,086 | 1/1977 | Larsen et al. | 360/53 |
| 4,131,861 | 12/1978 | Malaviya | 331/2 |
| 4,399,474 | 8/1983 | Coleman, Jr. | 360/46 |
| 4,467,374 | 8/1984 | Batey et al. | 360/46 |
| 4,535,371 | 8/1985 | Harr et al. | 360/67 |
| 4,670,776 | 6/1987 | Matsumoto | 358/19 X |
| 4,726,022 | 2/1988 | Chan et al. | 371/5 |
| 4,750,058 | 6/1988 | Hirt et al. | 360/46 |
| 4,751,565 | 6/1988 | Emmons et al. | 358/19 |
| 4,786,993 | 11/1988 | Jove et al. | 360/67 |
| 4,803,445 | 2/1989 | Yamasaki | 331/177 R |
| 4,829,267 | 5/1989 | Sandusky | 330/259 |
| 4,837,642 | 6/1989 | Smidth | 360/46 |
| 4,937,575 | 6/1990 | Kummer | 341/141 X |
| 4,970,609 | 11/1990 | Cunningham et al. | |
| 5,057,785 | 10/1991 | Chung et al. | |
| 5,057,946 | 10/1991 | Sugiyama | |
| 5,220,466 | 6/1993 | Coker et al. | 360/46 |
| 5,233,482 | 8/1993 | Galbraith et al. | 360/46 |

FOREIGN PATENT DOCUMENTS 59-24407 2/1984 Japan.
02285526 11/1990 Japan.
03-70316 3/1991 Japan.

OTHER PUBLICATIONS

Chung et al., "Nonlinear Monopolar Signal-Adaptive Residue Suppressor", Nov. 1990, pp. 255–257, vol. 33, No. 6A.

Chung et al., "Prefiltering in the Design of Peristaltic Envelope Detectors", Mar. 1991, pp. 48–52, vol. 33, No. 10B.

Heise et al., "Offset Binary Simplifies Gain Control in a PRIV Communication Channel", May 1991, pp. 13–17, vol. 33, No. 12.

Heise et al., "Offset Binary Simplifies Timing Control in a PRIV Communication Channel", May 1991, vol. 33, No. 12, pp. 5–8.

Heise et al., "Offset Binary Enhances Control Loop Accuracy in a PRIV Channel", May 1991, vol. 33, No. 12, pp. 185–187.

Primary Examiner—Donald Hajec
Assistant Examiner—Thien Minh Le
Attorney, Agent, or Firm—Joan Pennington; Matthew J. Bussan; Pryor A. Garnett

[57] ABSTRACT

Apparatus and method of data recovery are provided for data detection in a partial-response (PR) data channel. The PR data channel includes an analog-to-digital converter (ADC) for providing digital samples of a readback data signal and a voltage controlled oscillator (VCO) timing control coupled to the ADC. A data recovery procedure (DRP) is established responsive to a detected readback error. Using amplitude offset circuitry, amplitude of the readback data signal is selectively adjusted responsive to the detected readback error; and using gain control, a correction current applied to the VCO timing control is changed responsive to the detected readback error.

15 Claims, 6 Drawing Sheets

DATA RECOVERY PROCEDURE USING DC OFFSET AND GAIN CONTROL FOR TIMING LOOP COMPENSATION FOR PARTIAL-RESPONSE DATA DETECTION

BACKGROUND OF THE INVENTION

1. Field of the Invention

The invention relates generally to a method and apparatus for data recovery when readback error is detected in a direct access storage device (DASD), and more particularly to a method and apparatus for data recovery in a DASD of the type utilizing a magnetoresistive (MR) transducer head and partial-response (PR) data detection.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. Various data recovery procedures (DRP's) are known in the art for use when error is detected in the readback of data from the disks.

The combination of magnetoresistive (MR) head technology and other commonly known phase error mechanisms, with the partial-response (PR) data channel has caused a pattern sensitivity problem concerning the reading of repeating patterns from the disk drive. An MR transducing head exhibits a change in resistance when in the presence of a changing magnetic field. This resistance change is transformed into a voltage signal by passing a constant current through the MR element. The value of DC voltage for a given head is the product of the constant bias current and the total resistance between the head lead terminals. The MR voltage readback signal is sampled by an analog-to-digital converter (ADC). DC offset and distortions in the MR voltage readback signal cause the sampled A/D values to be amplitude shifted from their ideal values. For the PR channel, the ideal ternary amplitude values are either $+1, 0$ or $-1$ levels. Small amplitude shifts in the ternary levels are to be expected. However, if the amplitude shifts occur on the ternary levels in a repeating pattern, the amplitude shifted ADC samples will cause reduced margin in the detector, timing loop, and gain loop algorithms.

When an MR head reads back a low frequency pattern, the large amplitude can excite instabilities that are not excited when the head reads a high frequency pattern of lower amplitude. This can result in a net phase shift of the low frequency pattern, while not shifting the high frequency pattern. This phase error in combination with other known timing errors such as electronic channel phase error and incorrect setting of write precompensation values can result in a significant timing shift between repeated patterns of high and low frequencies. Such a stress pattern is called a B6E8 stress pattern in the described system. In this system, a B6 hex code for a customer byte is encoded into the codeword 101101101. Given the proper state of the encoder, this is recorded with a single pulse for each adjacent pair of ones, and these pulses alternate signs. Thus repeated bytes of this pattern results in a readback waveform with a period of six clock cells. The E8 customer byte results in the codeword 011011011. This appears as just a shifted version of the previous word; however, with the change in state of the encoder from having a single unpaired one at the end of the B6 codeword before the E8 codeword, the written pattern is changed. In this case the adjacent ones in the pattern are written with two closely spaced pulses of opposite polarity, resulting in one sample at $+1$ and one sample at $-1$. Thus the period of the wave is 3 clock cells as can be seen in FIG. 6. This pattern is twice the frequency of the previous codeword. This pattern is used as the high frequency and the previous pattern as the low frequency. This high frequency pattern also has write precompensation on one of each pair of pulses, whereas the low frequency pattern does not. Thus any error in the value of the write precompensation also induces a phase error, or timing difference between the patterns. The total error can be expressed in nanoseconds. This total timing error drives the timing loop to swing back and forth between the phases of each pattern, and the transient behavior produces some overshoot which adds to the maximum timing error.

Transient behavior that exceeds the capture range of the VCO causes the VCO to loose lock with the readback data signal which also is called a sync slip. Dynamic VCO overshoot after pattern switches can cause sync slip. One worst case pattern having repeating patterns of the low and high frequency, and a length near 18 bytes long causes the worst overshoot.

SUMMARY OF THE INVENTION

A principal object of the present invention is to provide improved methods for data recovery for data detection in a disk drive data storage system. Other objects are to provide such improved data recovery methods substantially without negative effects for use in a disk file of the type utilizing a magnetoresistive (MR) transducer head and a partial-response (PR) data channel, and that substantially overcome pattern sensitivity problems to avoid otherwise non-recoverable errors.

In brief, the objects and advantages of the present invention are achieved by apparatus and a method for data recovery for data detection in a partial-response (PR) data channel. The PR data channel includes an analog-to-digital converter (ADC) for providing digital samples of a readback data signal and a voltage controlled oscillator (VCO) timing control coupled to the ADC. A data recovery procedure (DRP) is established when a readback error is detected. Using amplitude offset circuitry, amplitude of the readback data signal is selectively adjusted responsive to the detected readback error; and using gain control, a correction current applied to the VCO timing control is changed responsive to the detected readback error.

BRIEF DESCRIPTION OF THE DRAWING

The present invention together with the above and other objects and advantages may best be understood from the following detailed description of the embodiment of the invention illustrated in the/drawings, wherein.

DETAILED DESCRIPTION OF THE PREFERRED EMBODIMENT

Figure 1:
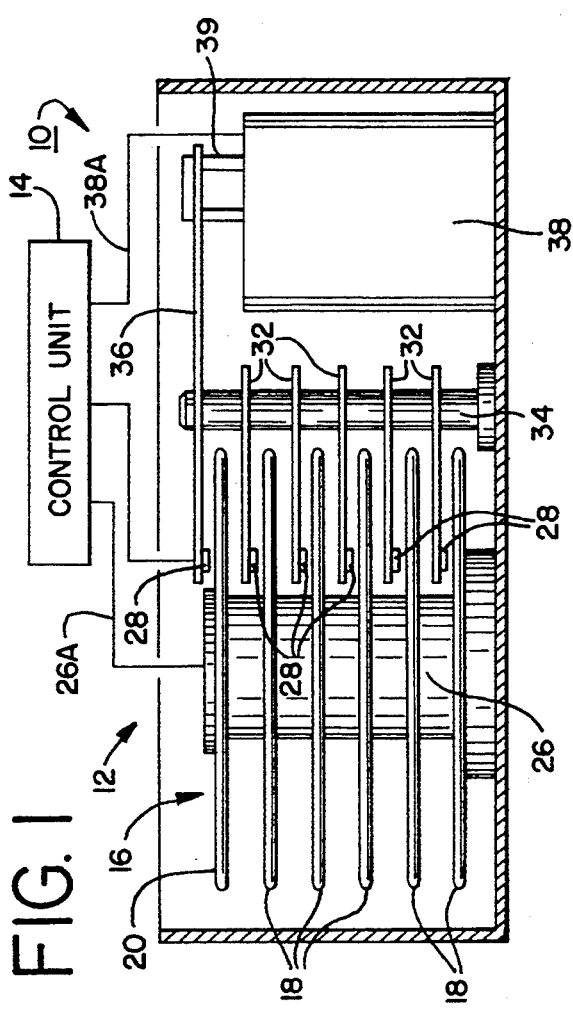
FIG. 1 is a schematic and block diagram of a data storage disk file embodying the present invention.

In FIG. 1 there is shown a partly schematic block diagram of parts of a data storage disk file 10 including a data storage medium generally designated as 12 and an interface control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Figure 2:
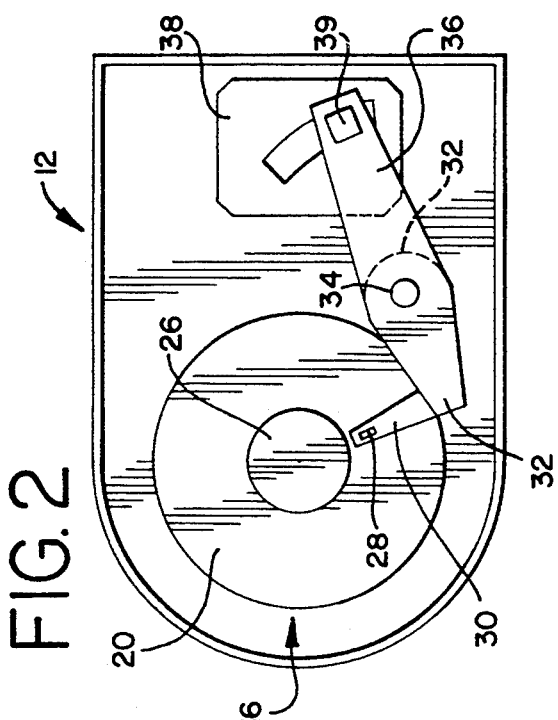
FIG. 2 is a diagram showing the accessing mechanism for a single disk surface of the apparatus of FIG. 1.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the magnetic disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil 39 cooperating with a magnet and core assembly (not seen) operatively controlled for moving the transducer heads 28 in synchronism in a radial direction in order to position the heads in registration with data cylinders to be followed. The various components of the disk file 10 are controlled in operation by signals generated by control unit 14 such as motor control signals on line 26A and position control signals on line 38A.

Figure 3:
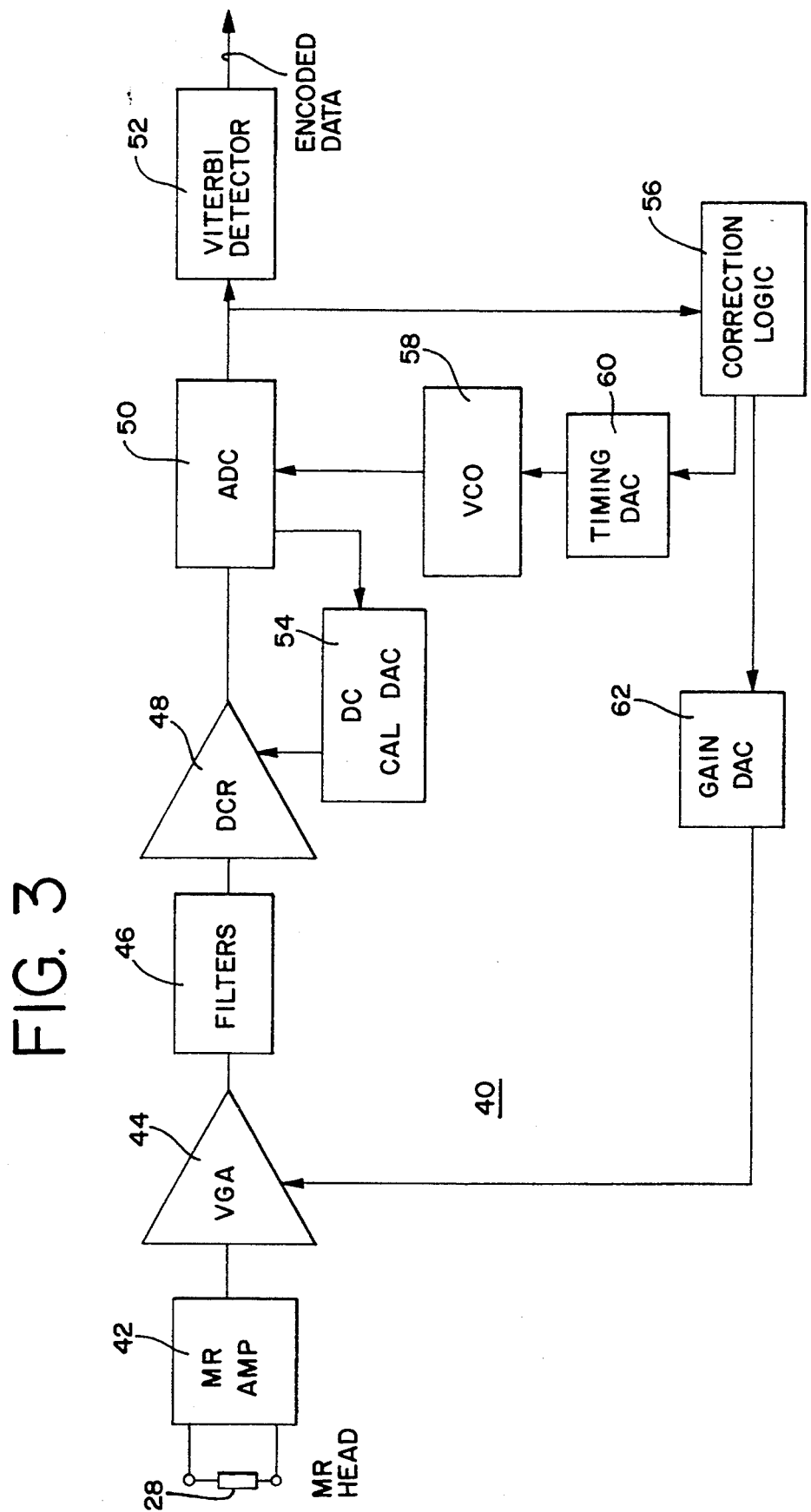
FIG. 3 is a diagram illustrating apparatus for carrying out data recovery according to methods of the present invention in the data storage disk file of FIG. 1.

Referring now to FIG. 3, there is shown a block diagram of a readback portion of PR data channel 40 in disk file 10 used for carrying out data recovery methods of the invention. An analog readback signal is obtained at the MR transducer head 28 and applied to an MR amplifier 42. The amplified readback signal is applied to a variable gain amplifier (VGA) 44. The amplified read signal is applied to an analog filter 46, and the filtered readback signal is coupled by a DC restore (DCR) circuit 48 to an analog-to-digital converter (ADC) 50. The readback signal is converted to digital form by ADC 50 that provides digital sampled values to a Viterbi decoder 52 for encoded data processing. Sample values of the ADC 50 are applied to a DC calibration digital-to-analog converter (DAC) 54 coupled to the DCR 48.

Samples of the ADC 50 are applied to a correction logic block 56. Correction logic block 56 is coupled to a timing control DAC 60 and a gain DAC 62. The timing control DAC 60 provides a timing control signal to the ADC 50 via a voltage controlled oscillator (VCO) 58. The gain DAC 62 provides a gain control signal to the VGA 44.

The timing loop algorithm, which sets the phase and frequency of voltage controlled oscillator VCO 58, is the most sensitive to repeated ADC amplitude shifts. The VCO phase will drift from its ideal location as a repeated pattern with amplitude shifts is sampled. The most stressful situation occurs when one group of repeating patterns is followed by another group. The VCO 58 has to resolve the phase difference between the different groups of repeating patterns. If the phase shift is significant enough between repeating patterns, typically a VCO will lose synchronization, severely degrade read performance, and cause non-recoverable errors.

The present invention effectively solves this problem of unrecoverable errors from repeating patterns by providing a data recovery procedure (DRP) in a disk drive 10 using amplitude offset of the data readback signal before the data signal is sampled by the ADC. The DRP of the invention also combines the amplitude or DC offset with a gain change in VCO timing. An increased loop gain for the VCO 58 in combination with the DC offset provides improvement in reading otherwise non-recoverable repeating stress pattern data.

Figure 4:
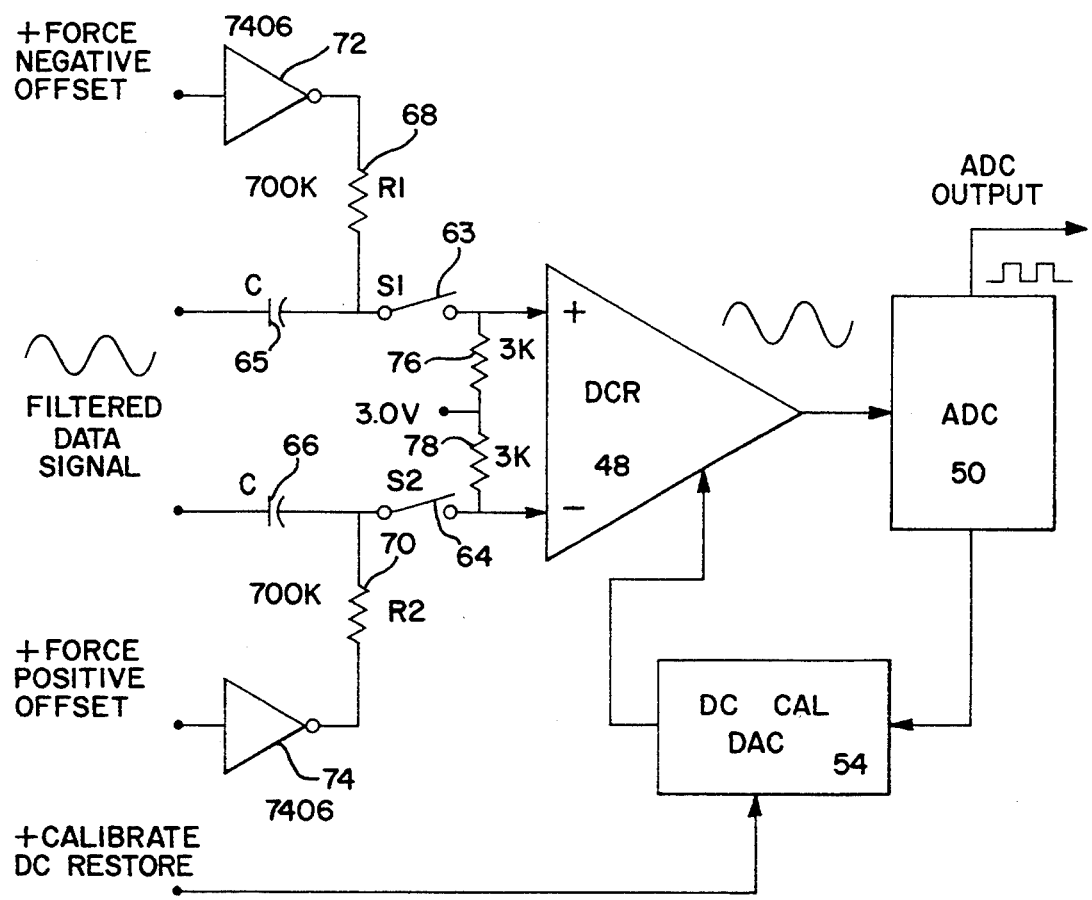
FIG. 4 is a diagram illustrating apparatus for carrying out a data recovery method using amplitude shifted or offset analog-to-digital converter (ADC) samples for VCO timing according to the present invention in the data storage disk file of FIG. 1.

FIG. 4 shows a block diagram illustrating apparatus for carrying out a data recovery method using amplitude shifted or offset analog-to-digital converter (ADC) samples for VCO timing compensation to solve DC shifted errors. The filtered data signal from the filter section 46 is coupled by the DCR 48 to the ADC 50. The purpose of the DCR 48 is to eliminate the DC offset error of data signal passing into the ADC 50. A normal calibration procedure is provided to force the DCR 48 to the center sampling operation of the ADC 50. This calibration procedure causes a pair of switches or field effect transistors (FET's) 63 and 64 (S1 and S2) to open so that the data signal does not affect the calibration procedure. The normal ADC calibration does not correct for DC errors in the readback data signal. During normal data readback of the file 10, the FET's S1 and S2 are closed.

In accordance with a feature of the invention, during a data recovery procedure (DRP) the DC level of the data signal is shifted or offset independently of the normal ADC calibration procedure. FET's S1 and S2 are closed during the data recovery procedure, and the DC shift is accomplished by forcing the DC offset before S1 and S2, after a pair of AC coupling capacitors 65 and 66 coupling the filtered readback data signal. This arrangement allows the normal ADC calibration procedure to be unaltered. The DC offset is provided with a pair of resistors 68 and 70 each coupled to an inverter 72 and 74, such as a device type 7406 inverter with open collector outputs. Logic signals +FORCE NEGATIVE OFFSET and +FORCE POSITIVE OFFSET coupled by the inverters 72 and 74 and resistors 68 and 70 are used to force the DC offset output of DCR 48 in either the positive or negative direction. A voltage divider is provided by a pair of resistors 76 and 78 and resistors 68 and 70. For example, when +FORCE NEGATIVE OFFSET is active or high, resistor 68 is pulled low to 0.1 volts. The voltage divider between the 3K resistor 76 and the 700K resistor 68 sets the voltage across the 3K resistor 76 to 12.4 mV. Using a gain of the DCR circuit 48 of 2 V/V, the 12.4 mV input offset at the positive input provides −24.8 mV at the DCR output. When +FORCE POSITIVE OFFSET is active, the DCR output offset is +24.8 mV. As a data recovery procedure, the disk file 10 enables +FORCE NEGATIVE OFFSET or +FORCE POSITIVE OFFSET to shift the DC level of the DCR output to correct either positive or negative DC shift errors. The amount of the DC shift can be changed by changing resistors 68 and 70. The DC level offset of ±24.8 mV represents a shift of ±20% of the total timing threshold window which is at 125 mV.

Test data has shown that the worse case DC shift is 63 mV, but typically the DC shift is about 30 mV. Using the exampled ±24.8 mV DC shift set for disk file 10 and with the worse case DC shift, the data signal is sufficiently adjusted to bring the ADC samples within the timing threshold window.

Figure 5:
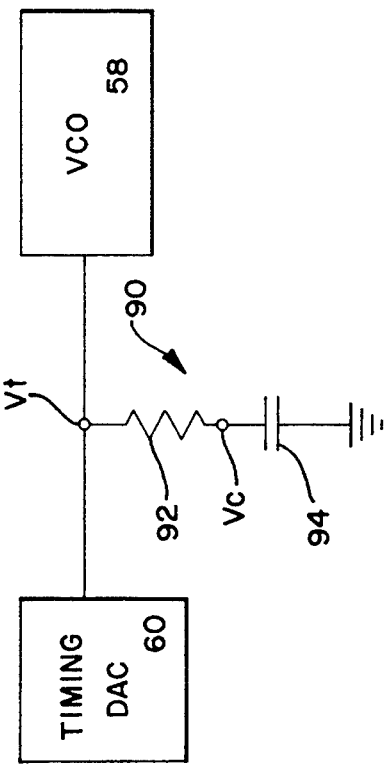
FIG. 5 is a diagram illustrating voltage controlled oscillator (VCO) apparatus for carrying out a data recovery method using gain change in VCO timing according to the present invention in the data storage disk file of FIG. 1.

Referring to FIG. 5, VCO 58 includes a filter section generally designated 90 formed by a resistor 92 and a capacitor 94. R-C filter 90 filters the correction currents to smooth out the corrections. The pulses across the resistor 92 tend to pulse the frequency, giving a phase shift, and there is no frequency shift once the pulse is gone. The capacitor 94 integrates the pulses of the correction current to get the nominal frequency to the right place. The result of this is that if a change in phase occurs, such as from one pattern to another, there will always be some correction to the frequency corresponding to Vc voltage on the capacitor 94 that must be reduced again to the original value to maintain the steady state frequency. All VCO systems have some amount of overshoot in the dynamics.

The basic VCO system converts the calculated timing error into a correction current applied to R-C filter 90. The voltage Vt across the filter then drives the voltage controlled oscillator (VCO) 58. The oscillator phase is the reference against which the timing error is measured. This completes the VCO system timing loop.

Figure 6:
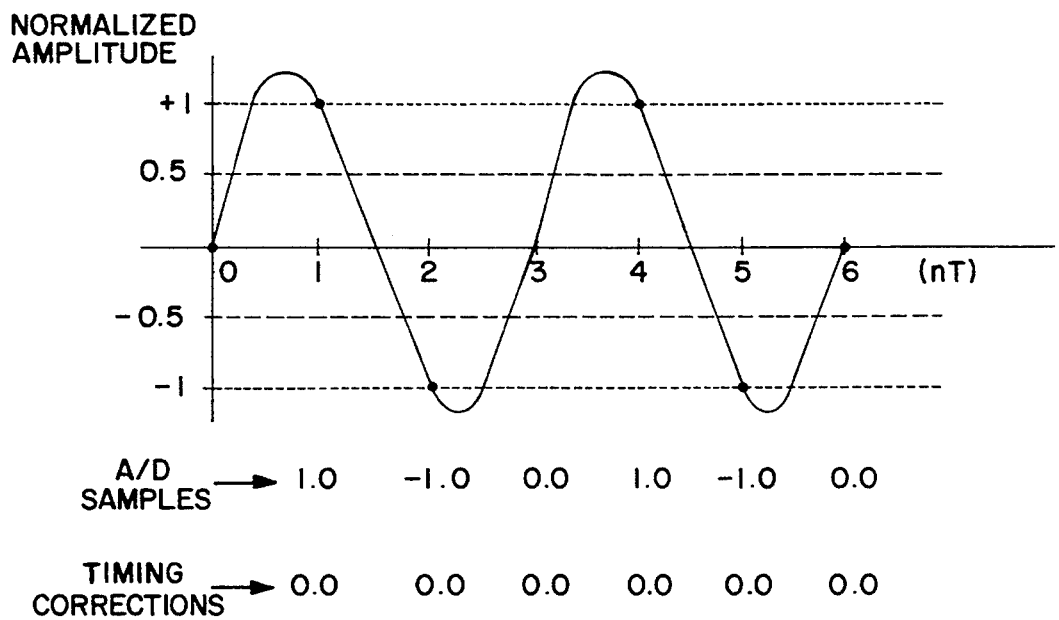
FIGS. 6, 7, 8, 9, 10 and 11 are graphs to illustrate the operation of data recovery methods of the present invention.

An analysis of the transient behavior of the timing loop requires the values of the R-C circuit, the conversion factor from timing error to control current into the R-C circuit, and the conversion factor of the resultant voltage across the R-C circuit to frequency change of the VCO. The VCO conversion factor was determined to be about 7 KHz per millivolt (mV). The conversion from timing error to control current is done digitally; however, an analog averaging factor is used for the slow transient response of the system. In a system with a 27 MHz clock, the E8 pattern with the correct initial state produces a 9.0 MHz wave, as shown in FIG. 6. The average conversion constant for this pattern is about 7.2 uA/ns. The B6 pattern with the correct initial state produces a 4.5 MHz wave. Due to the slope of this wave being half as fast in time, the conversion constant for this pattern is half that of the previous pattern, or 3.6 uA/ns.

With the conversion factors and values of the R-C circuit, which are a compromise between capture lock-on in a reasonable time and stability of the loop, the timing overshoot was 50% when the worst case pattern had 20 bytes of each frequency.

During a DRP, by using a three times higher correction current from the timing DAC 60 into the filter 90, the position of maximum overshoot is reduced to about half the time, and the overshoot at the worst case pattern with 20 bytes of each frequency is virtually zero, significantly improving the margin against a sync slip failure. The worst case pattern for the control loop with the higher gain is with patterns of alternating frequency with lengths of about 9 bytes, and the resulting overshoot is reduced to 32%. Thus even if a data sector contained portions of repeating patterns of both 20 byte lengths and 9 byte lengths, the reduced overshoot still provides a significant improvement.

The increased current from DAC 60 is supplied by an additional resistor and a TTL switch to enable the extra current during the DRP. This is done in the same way as the increased current is achieved during the original sync field lock-on. A higher correction current is not used for the normal data processing, since the VFO is slightly more sensitive and would create some increase in soft error rate for nominal case patterns as compared to the normal selected compensation current.

The increased loop gain for the VCO 58 by the change in correction current has been experimentally shown to be very effective, both alone and in combination with the DC offset of readback signal.

Referring to FIGS. 6-11, the graphs show how the ADC samples become shifted from ideal conditions. These graphs are simulated and show the general trends of how the ADC samples are DC shifted.

FIG. 6 shows a sequence of seven ADC samples taken at 7 clock intervals denoted as nT samples 0 through 6. The amplitude of the samples are normalized to 1.0 with the amplitude sequence being 0, +1, −1, 0, 1, −1 and 0. Because the ADC samples are perfect, the timing corrections will be 0.0 for each sample taken on FIG. 2. The timing corrections are a function of the current ADC sample and the previous ADC sample.

Figure 7:
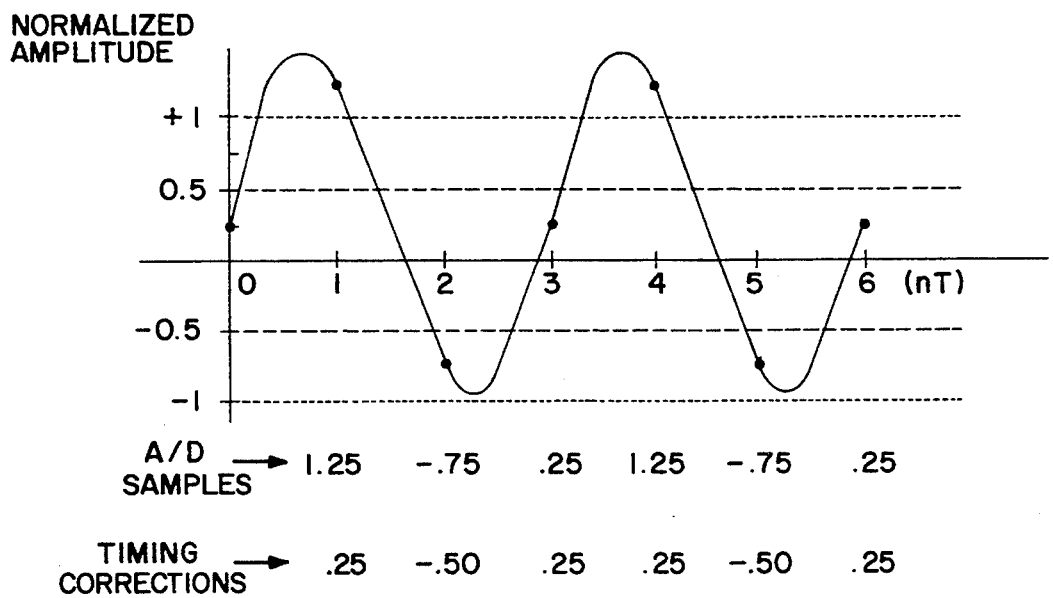

FIG. 7 shows the same sequence of ADC samples as FIG. 6, but these ADC samples are DC shifted positive into the ADC 50 by 0.25 normalized to 1.0. The timing corrections are not zero as in the ideal case shown in FIG. 6, but the average timing correction over three samples is zero $(0.25-0.5+0.25)/3=0$. The VCO 58 will not change frequency over several samples, but this will reduce the timing correction margin. The DC shift in this illustration represents a DC shift of 63 mV.

Figure 8:
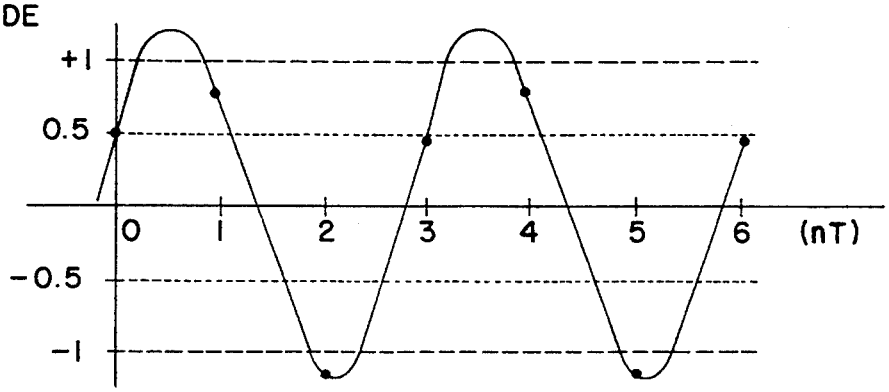

FIG. 8 shows the same sequence as FIG. 6, but these ADC samples are phase shifted by 20 degrees. The average VCO timing correction per clock cycle is a positive 0.4 value. This causes the VCO to provide an increased frequency because the ADC samples are late, relative to the data signal for each clock cycle.

Figure 9:
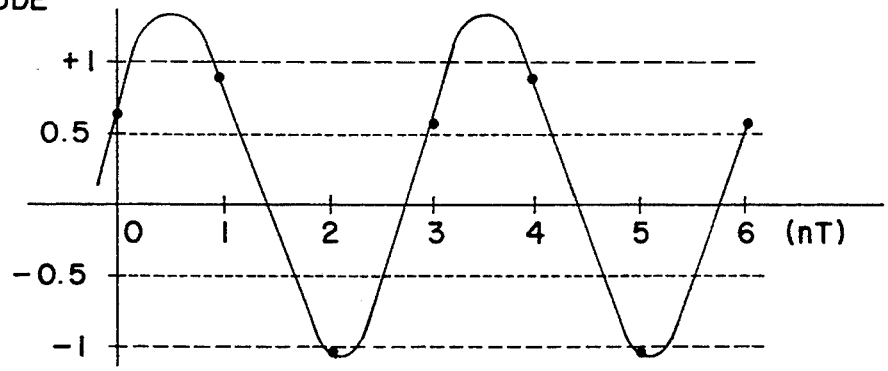

FIG. 9 shows the same sequence as FIG. 6, but these ADC samples are phase shifted by 20 degrees and DC shifted by 0.13. This example illustrates how two stress mechanisms combined can together force the VCO timing corrections in the wrong direction. The average timing correction is $-0.37+0.14-0.48)/3=-0.24$. This will cause the VCO 58 to provide a reduced frequency, which is the wrong direction. The VCO 58 will drift and lose synchronization with the data signal. The large negative corrections are a result of the ADC samples at the sample numbers 3 and 6 going above the 0.5 level threshold. The timing algorithm interprets these ADC samples as +1 when they should have been 0 samples.

Figure 10:
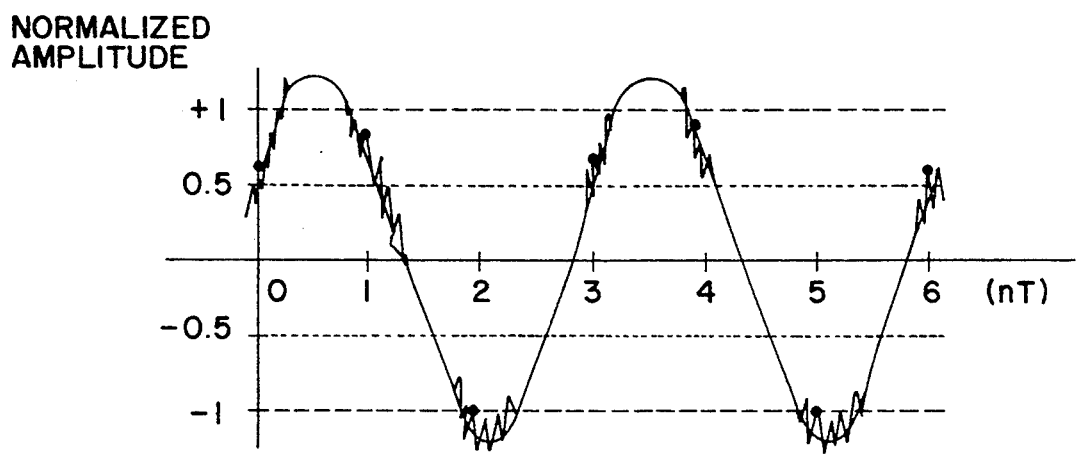

FIG. 10 shows the same sequence as FIG. 6, but these ADC samples are phase shifted by 20 degrees and DC shifted because of systematic noise added to the data signal. Typically such noise is due to the logic from the digital portion of the PR data channel 40, switching at the same rate as the VCO. As a result, the data signal will have synchronized switching noise added to it. This causes each ADC sample to have a DC offset in the same direction. In disk file 10 this synchronized switching noise is one of the primary causes of the VCO losing lock with the data on repeating data patterns. With mixed analog and digital electronics, the logic noise can be reduced but not totally eliminated from the analog data signals.

Figure 11:
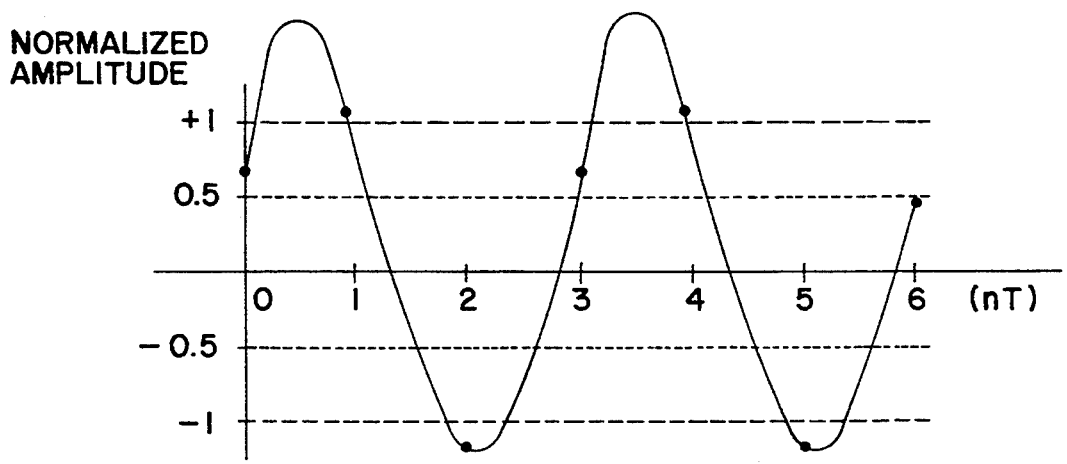

FIG. 11 shows the same sequence as FIG. 6, but these ADC samples are phase shifted by 20 degrees and DC shifted on the positive side of the data signal. This amplitude asymmetry is caused by the MR transducer head 28. The range of the amplitude asymmetry can range from 0 to 30% of the peak to peak signal and is common for MR transducer head technology. This will cause a positive shift of the ADC samples on the positive side of the data signal and again cause the ADC sample to pass over the +0.5 level threshold to cause a VCO correction in the wrong direction. This problem is unique to MR technology and sampled data detectors such as the PR data channel 40.

The following table provides an example DRP in accordance with the invention having selected DRP steps with predetermined combinations of VCO gain change and DC offset.

TABLE 1

| DRP STEP/ACTION | SELECT CONTROL |
| --- | --- |
| 3 RR | Fast VCO, negative DC offset |
| 4 RR | Fast VCO, positive DC offset |
| 14 ECC | Fast VCO, no DC offset |
| 16 ECC | Fast VCO, no DC offset |
| 23 ECC | Nom VCO, negative DC offset |
| 24 ECC | Nom VCO, positive DC offset |
| 25 ECC | Nom VCO, positive DC offset |
| 26 ECC | Nom VCO, negative DC offset |

What is claimed and desired to be secured by Letters Patent of the United States is:

1. Apparatus for data recovery for data detection in a partial-response (PR) data channel including an analog-to-digital converter (ADC) for providing digital samples of a readback data signal and a voltage controlled oscillator (VCO) timing control coupled to the ADC, said apparatus comprising:
   means for detecting a readback error and establishing a data recovery procedure (DRP) responsive to said detected readback error;
   amplitude offset means for adjusting amplitude of the readback data signal by a selected DC offset responsive to said detected readback error; said amplitude offset means being operative to offset said readback data signal during the DRP independently of a normal ADC calibration function; and
   gain control means for increasing a correction current applied to the VCO timing control responsive to said detected readback error; said gain control means being operative during the DRP for providing increased correction current.

2. Apparatus as recited in claim 1 further comprising: a magnetoresistive (MR) transducing head providing an analog readback data signal.

3. Apparatus as recited in claim 1 wherein said gain control means provides a correction current of three times a normal operating correction current value.

4. Apparatus as recited in claim 1 wherein said DRP includes predetermined sequential steps and wherein during selected data recovery steps, said amplitude offset means and said gain control means are operative individually.

5. Apparatus as recited in claim 1 wherein said DRP includes predetermined sequential steps and wherein said amplitude offset means and said gain control means are simultaneously operative during selected data recovery steps.

6. Apparatus as recited in claim 1 wherein said amplitude offset means include a DC restore circuit for adjusting an analog signal coupled to said ADC by said selected DC offset.

7. Apparatus as recited in claim 6 wherein said amplitude offset means include a voltage divider coupled to said DC restore circuit for providing either a selected positive or negative DC offset value.

8. Apparatus as recited in claim 1 wherein said amplitude offset means include means for generating a positive offset signal and means for generating a negative offset signal.

9. Apparatus as recited in claim 1 wherein said DRP includes predetermined sequential steps and wherein said amplitude offset means include means for generating a positive offset signal and means for generating a negative offset signal and wherein said gain control means includes means for generating a nominal correction current or a selected increased correction current and predetermined DRP steps include predetermined combinations of selected operative amplitude offset means and gain control means.

10. A method for data recovery for data detection in a partial-response (PR) data channel including an analog-to-digital converter (ADC) for providing digital samples of a readback data signal and a voltage controlled oscillator (VCO) timing control coupled to the ADC, said method comprising the steps of:
   detecting a readback error and establishing a data recovery procedure (DRP) responsive to said detected readback error;
   using amplitude offset means, selectively adjusting amplitude of the readback data signal by a selected DC offset during the DRP independently of a normal ADC calibration function responsive to said detected readback error; and
   using gain control means, increasing a correction current applied to the VCO timing control during the DRP independently of a normal ADC calibration function responsive to said detected readback error.

11. A method as recited in claim 10 wherein said step of selectively adjusting amplitude of the readback data signal includes the steps of applying a negative DC offset during a first DRP step and applying a positive DC offset during a subsequent DRP step.

12. A method as recited in claim 11 wherein said step of using gain control means, increasing a correction current applied to the VCO timing control during the DRP independently of a normal ADC calibration function responsive to said detected readback error includes the steps of:
   providing an increased correction current to the VCO simultaneously with using said amplitude offset means for applying a negative DC offset during a first DRP step and applying a positive DC offset during a subsequent DRP step.

13. A method as recited in claim 10 wherein the step of changing a correction current applied to the VCO timing control includes the step of providing an increased correction current to the VCO.

14. A direct access storage device of the type including a partial-response (PR) data channel comprising:
- a housing;
- at least one disk mounted in said housing for rotation about an axis and having at least one disk surface for storing data;
- magnetoresistive (MR) transducer means mounted for movement across said disk surface for reading and writing data to said disk surface;
- an analog-to-digital converter (ADC) coupled to said transducer means for converting an analog readback signal to digital sample values;
- a voltage controlled oscillator (VCO) timing control coupled to the ADC;
- means for detecting a readback error and establishing a data recovery procedure (DRP) responsive to said detected readback error;
- amplitude offset means for adjusting amplitude of the readback data signal by a selected DC offset responsive to said detected readback error; said amplitude offset means being operative to offset said readback data signal during the DRP independently of a normal ADC calibration function; and
- gain control means for increasing a correction current applied to the VCO timing control responsive to said detected readback error; said gain control means being operative during the DRP for providing increased correction current independently of a normal ADC calibration function.

15. A direct access storage device as recited in claim 14 wherein said amplitude offset means include a DC restore circuit for adjusting an analog signal coupled to said ADC by said selected DC offset and a voltage divider coupled to said DC restore circuit for providing either a selected positive or negative DC offset value.

* * * * *